(12) United States Patent
Hakes et al.

(10) Patent No.: US 9,434,428 B2
(45) Date of Patent: Sep. 6, 2016

(54) TRACK PAD WEAR INDICATOR

(71) Applicant: Caterpillar Inc., Peoria, IL (US)

(72) Inventors: David J. Hakes, Brimfield, IL (US); Benoit Abello, Dunlap, IL (US); Roger E. Lawson, Brimfield, IL (US); Zoran Marjanovic, Wind Lake, WI (US)

(73) Assignee: Caterpillar Inc., Peoria, IL (US)

( * ) Notice: Subject to any disclaimer, the term of this patent is extended or adjusted under 35 U.S.C. 154(b) by 149 days.

(21) Appl. No.: 14/298,067

(22) Filed: Jun. 6, 2014

(65) Prior Publication Data

US 2015/0353152 A1    Dec. 10, 2015

(51) Int. Cl.
*B62D 55/20* (2006.01)
*B62D 55/21* (2006.01)

(52) U.S. Cl.
CPC ............ *B62D 55/20* (2013.01); *B62D 55/21* (2013.01); *Y10T 29/49718* (2015.01)

(58) Field of Classification Search
CPC ..... B62D 55/20; B62D 55/202; B62D 55/21
See application file for complete search history.

(56) References Cited

U.S. PATENT DOCUMENTS

| | | | |
|---|---|---|---|
| 4,423,910 A * | 1/1984 | Narang | B62D 55/20 305/100 |
| 5,348,515 A * | 9/1994 | Miller | B62D 55/12 474/152 |
| 6,533,371 B2 | 3/2003 | Hori et al. | |
| 6,612,423 B1 | 9/2003 | Silverman | |
| 8,011,739 B2 | 9/2011 | Busley | |

FOREIGN PATENT DOCUMENTS

| | | |
|---|---|---|
| EP | 0176796 | 4/1986 |
| EP | 2045176 | 4/2009 |
| EP | 2272739 | 1/2011 |

* cited by examiner

*Primary Examiner* — John Walters
*Assistant Examiner* — James Triggs
(74) *Attorney, Agent, or Firm* — Finnegan, Henderson, Farabow, Garrett & Dunner, LLP

(57) ABSTRACT

A track pad is disclosed for use for a track type mobile machine having a sprocket and an idler wheel. The track pad may have a first link with a rail surface configured to engage the sprocket and the idler wheel, and a second link oriented generally parallel with the first link and having a rail surface configured to engage the sprocket and the idler wheel. The track pad may also have a shoe connected to the first and second links at a side opposite the rail surfaces, and a wear indicator formed within the rail surface of at least one of the first and second links.

18 Claims, 2 Drawing Sheets

TRACK PAD WEAR INDICATOR

TECHNICAL FIELD

The present disclosure relates generally to a track pad and, more particularly, to a track pad having a wear indicator.

BACKGROUND

A track-type mobile machine utilizes tracks located at either side of the machine to propel the machine. The tracks include chains having links pinned end-to-end to form a loop that extends around a drive sprocket and one or more idler wheels, and ground engaging elements known as track shoes connected to each pair of links in the chains. A track shoe, together with a pair of links, is known as a track pad. In some configurations, the track pad is a single integral component. The sprocket is driven by an engine of the machine to rotate the chains and push the track pads against a work surface, thereby transmitting torque from the engine to the surface in opposition to a desired travel direction of the machine.

Over time, the track pads wear, creating slack in the chains between the sprocket and the idler wheel(s). This slack, if unaccounted for, can cause the chains to wear excessively, break, and/or to slip off the drive sprocket and idler wheel(s). When this occurs, the machine is pulled out of service for a time and labor-intensive service operation. In some instances, replacement parts are not available at the time of track failure, thereby creating even more downtime while waiting for parts to be ordered and shipped to the service facility. Accordingly, it can be important to periodically monitor track pad wear, so that the appropriate parts can be procured in time for servicing and so that service can be performed before failure occurs.

One attempt to provide for wear monitoring is disclosed in U.S. Pat. No. 6,533,371 that issued to Hori et al. on Mar. 18, 2003 ("the '371 patent). Specifically, the '371 patent discloses a shoe for the crawler belt of a track-laying vehicle. The shoe is directly fixed to links of the crawler belt by means of bolts. The different links are connected end-to-end by pins, and the crawler belt is driven through engagement of the pins with a sprocket. The ground face of the shoe has grooves, each of which is provided with a wear indicator that provides an indication of a wear limit of the shoe. With this configuration, the wear limit of the shoe can be understood at a glance, and the wear indicator serves as an index of right timing for replacement of the shoe.

While the wear indicators of the '371 patent may help to determine when the ground surface of a track shoe is worn, it may be less than optimal. In particular, depending on the size of the track-laying vehicle and/or its application, it may be possible for the links of the crawler belt to wear at a greater rate than the track shoes. And, in these situations, the wear indicators of the '371 patent would not provide sufficient indication of an impending failure. In addition, these wear indicators may only provide an indication of when the track shoe is completely worn and needs to be replaced. This may not give enough warning for parts to be ordered and service to be scheduled in advance of failure.

The disclosed wear monitoring system is directed to overcoming one or more of the problems set forth above.

SUMMARY

In one aspect, the present disclosure is related to a track pad for use for a track type mobile machine having a sprocket and an idler wheel. The track pad may include a first link having a rail surface configured to engage the sprocket and the idler wheel, and a second link oriented generally parallel with the first link and having a rail surface configured to engage the sprocket and the idler wheel. The track pad may also include a shoe connected to the first and second links at a side opposite the rail surfaces, and a wear indicator formed within the rail surface of at least one of the first and second links.

In another aspect, the present disclosure is related to a method of retrofitting an existing track type machine with a track pad wear indicator. The method may include measuring an amount of wear in links of a track pad forming a portion of the track. The method may also include fabricating at least one recess within a least one of the links of the track pad. The at least one recess may correspond with the amount of wear measured in the links.

In another aspect, the present disclosure is related to an undercarriage component for a track type machine. The undercarriage component may include a wear surface configured to have contact with another component of the track type mobile machine. The undercarriage component may also include a plurality of spaced recesses formed within the wear surface and having varying depths.

DETAILED DESCRIPTION

Figure 1:
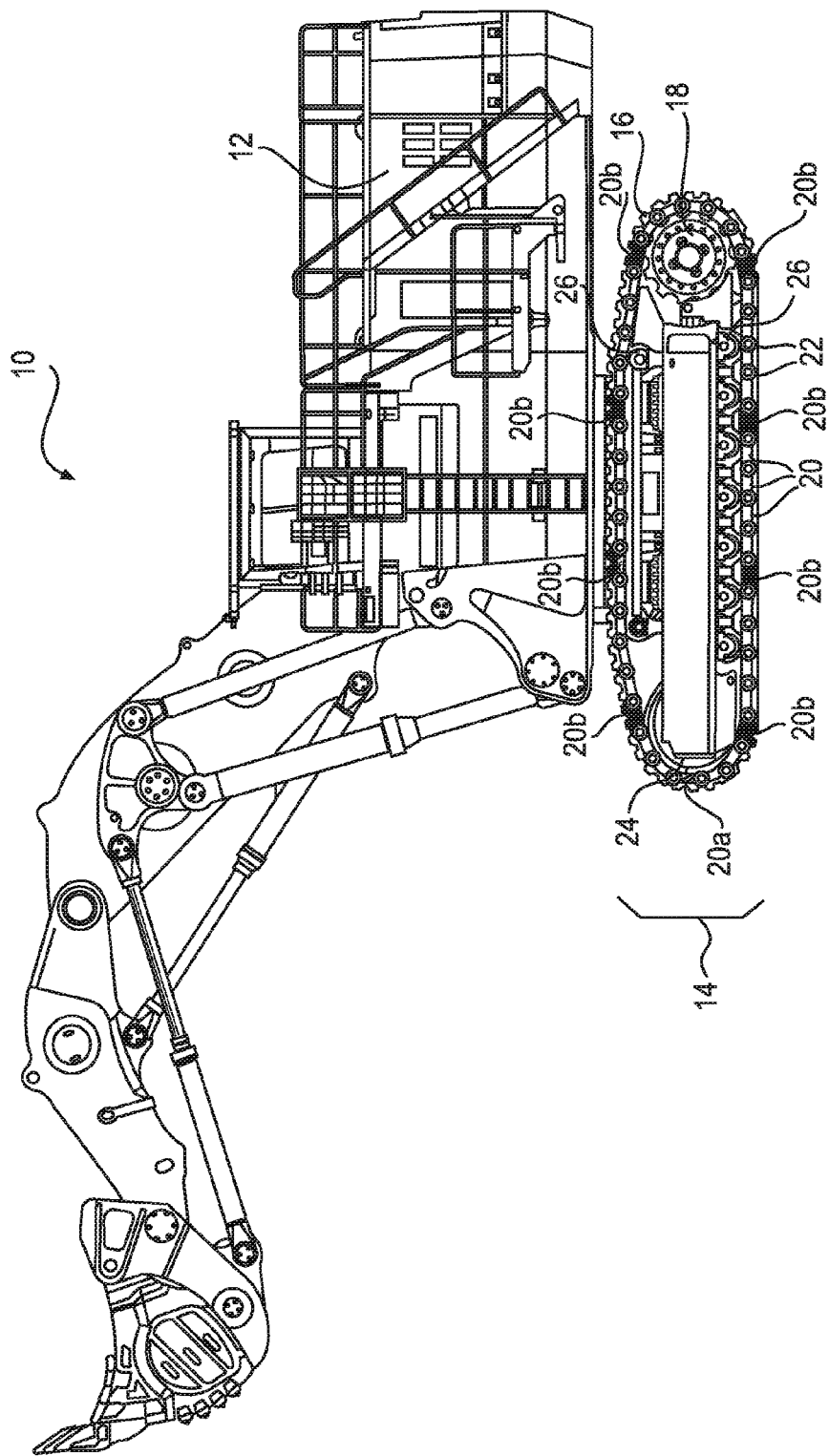
FIG. 1 is a side-view illustration of an exemplary disclosed mobile machine.

FIG. 1 illustrates a track type mobile machine 10 having an engine 12 configured to drive a tracked undercarriage 14. Mobile machine 10 may be any machine that performs an operation associated with an industry such as mining, construction, farming, or another industry known in the art. For example, machine 10 may be a material moving machine such as a front shovel, a rope shovel, a hydraulic excavator, a dozer, a loader, or another material moving machine.

Undercarriage 14 may include parallel tracks 16 located at opposing sides of machine 10 that are driven by engine 12 via corresponding sprockets 18 (only one track 16 and one sprocket 18 are shown in FIG. 1). Each track 16 may include a plurality of track pads 20 connected end-to-end via pins 22 to form an endless chain. The chains may be wrapped around corresponding sprockets 18, one or more idler wheels 24, and at least one load roller 26. Sprockets 18 may engage bushings (not shown) that encase pins 22 and thereby transmit torque from engine 12 to the chains. Idler wheel 24 and load rollers 26 may guide the chain in a general elliptical trajectory around sprocket 18. Track pads 20 may function to transmit the torque from sprockets 18 as a driving linear force into a ground surface.

In some embodiments, one or both chains of machine 10 may include different subsets of track pads 20. For example, a particular machine may include one or more track pads 20*a* that function as master links in their corresponding chains. These track pads 20*a* may have geometry different from the remaining track pads 20, and are used to selectively decouple the chain. That is, a service technician may be able to open the chain and gain access to internal components of undercarriage 14 by separating the chain at track pads 20*a*. In the same or another example, each chain may include a subset of wear indicating track pads 20*b*. As will be described in more detail below, wear indicating track pads 20b may be configured to indicate an amount of wear that has already taken place within track pads 20, an amount of wear remaining, and/or an amount of time until service of undercarriage 14 should be performed. In the disclosed example, wear indicating track pads 20b are a small subset of all track pads 20 within a single chain, and are spaced apart around the length of the chain. For example, about every $3^{rd}$ to $5^{th}$ track pad 20 may be a wear indicating track pad 20b. In some embodiments, wear indicating track pads 20b may be visibly marked (e.g., stamped or cast with identifying markings) so as to be easily identified during servicing of machine 10.

Figure 2:
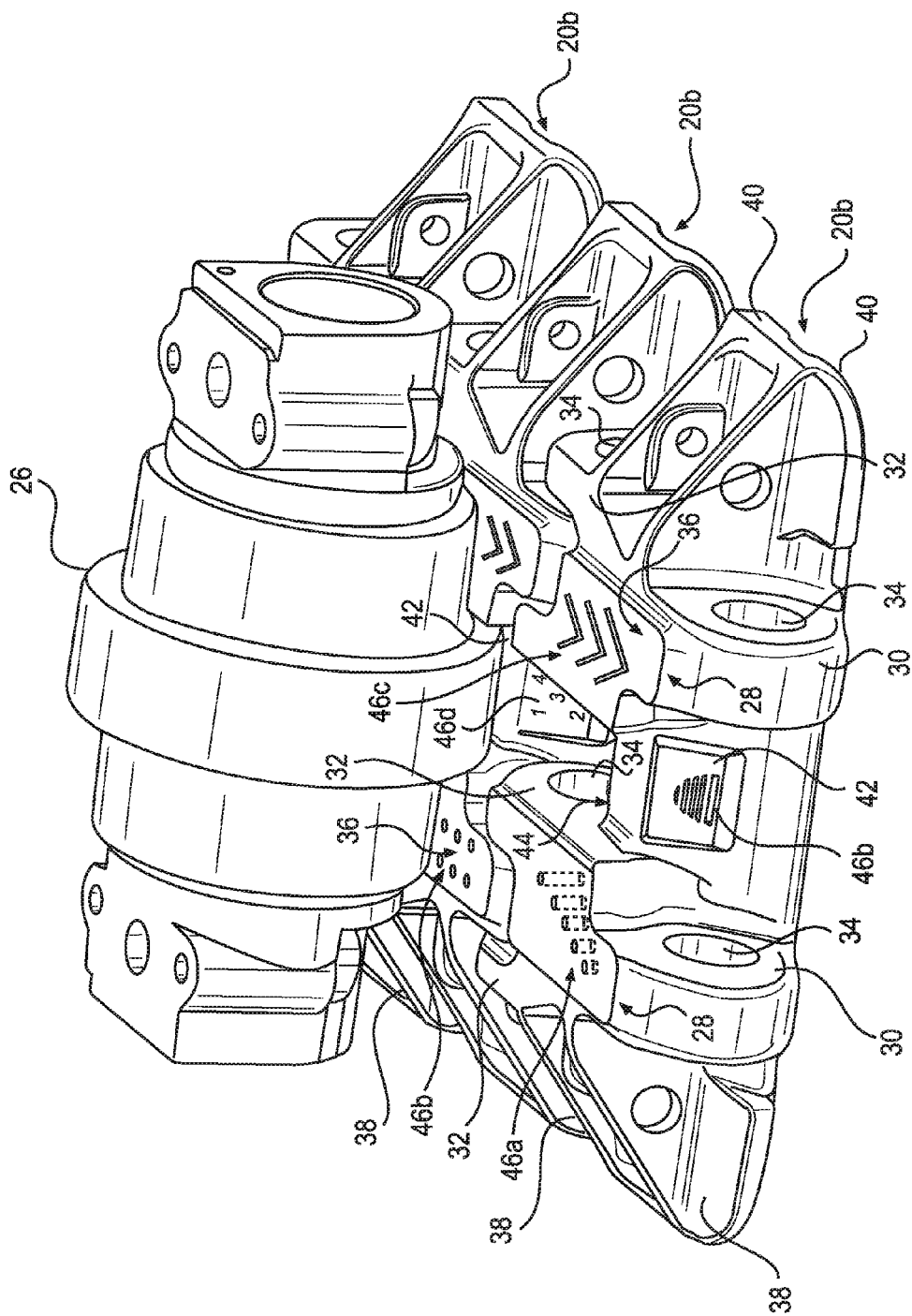
FIG. 2 is an isometric illustration of a track pad that may be used in conjunction with the mobile machine of FIG. 1.

As shown in FIG. 2, each track pad 20b may include two spaced-apart links 28 that are generally parallel with each other. Each link 28 may extend in a length direction of the associated chain, and include a single ear 30 located at a first end, and one or more ears 32 (e.g., two spaced apart ears 32) located at an opposing end. Pin bores 34 may be formed within each of ears 30, 32. Ear 30 of one track pad 20 may be configured to pass between ears 32 of an adjacent track pad 20, such that corresponding bores 34 align. Pins 22 (referring to FIG. 1) may then pass through the aligned ears 30, 32, thereby joining the adjacent track pads 20.

Each link 28 may include a rail surface 36 configured to engage the rotating components of undercarriage 14 (i.e., sprocket 18, idler wheel 24, and/or load rollers 26). Rail surfaces 36 of a single track pad 20b may be generally flat, and lie in a common plane. In the disclosed embodiment, each rail surface has an offset or zigzag shape, although other shapes may also be possible. A shoe 38 (or other ground engaging element) may be connected to links 28 opposite rail surface 36, thereby rigidly connecting links 28 to each other.

In the disclosed embodiment, shoe 38 and links 28 are integrally formed as a single cast and/or forged component. It is contemplated, however, that shoe 38 could initially be formed separately from links 28 and subsequently joined to links 28 via welding and/or threaded fastening, if desired. Shoe 38 may have any geometry known in the art. For example, shoe 38 may be generally plate-like, include transverse ridges 40, include grouser bars (not shown), have openings, or include any other features common in the art.

In some embodiments, each track pad 20b may also include forward and reverse driving surfaces 42, 44 located between links 28 and protruding inward from shoe 38. Driving surfaces 42, 44 may be configured to engage lugs of sprocket 18 (referring to FIG. 1), thereby transmitting the torque of sprocket 18 to track pad 20b. Driving surfaces 42, 44 may be oriented at oblique angles relative to rail surfaces 36.

During operation of machine 10, rail surfaces 36 of links 28 and driving surfaces 42, 44 may wear due to metal-on-metal contact with the other components of undercarriage 14. In order to plan for service needs of undercarriage 14, such that downtime of machine 10 is reduced, the wear of these components should be closely monitored. For this reason, some or all of these surfaces may be provided with a wear indicator 46.

Wear indicator 46 may include one or more recesses formed within the respective surface. In the disclosed example, each wear indicator 46 includes a plurality of recesses. Specifically, each wear indicator 46 may consist of recesses of different depths, wherein each depth corresponds with an amount of wear that has occurred, an amount of material yet to be worn, and/or an amount of time before servicing should be scheduled. These recesses may be arranged in any number of different patterns. For example, a particular wear indicator 46a may include a line of five recesses of increasing depth. In this example, each recess may correspond with about 20% wear. That is, when all five recesses are visible, track pad 20b may be new and worn very little. And as each recess is worn away, about 20% of an available amount of material will have been removed. Service should be called after the fourth recess in the line has disappeared, indicating that all available wear material is gone. When the fifth recess is no longer visible, track pad 20b may be 20% overworn, and machine 10 should be shut down before track failure occurs.

In another example, a particular wear indicator 46b may include a grid of recesses. The grid of recesses may include a plurality of recesses spaced from one another in both longitudinal and lateral directions to cover a portion of the associated wear surface. In this arrangement, uneven wear of track pad 20b may be observed by an uneven showing of the recesses. Uneven wear, if significant, could indicate problems with other components of undercarriage 14. In this situation, the recesses of wear indicator 46b may be used to diagnose the problems and/or adjust operation of the other components.

The shape of the recesses forming wear indicator 46 may vary, and be based on a particular machine type, machine size, and/or machine application. For instance, in one application, the recesses may be circular holes (see 46a and 46b) that are drilled into or otherwise formed within rail surfaces 36. In another application, the recesses may be grooves or chevrons (see 46b and 46c). In yet another application, the recesses may be alpha-numeric symbols (see 46d). Other shapes may also be possible. The holes may function well in dry applications where clogging with mud or other material is not a concern, and/or in retrofit applications where a time and ease of recess fabrication is important. The grooves and chevrons may be less prone to clogging, and facilitate uneven wear diagnostics with fewer required recesses. The alpha-numeric surfaces may make interpretation of the wear condition simpler. Any number and type of wear indicators 46 may be used within a single application.

INDUSTRIAL APPLICABILITY

The track pad of the present disclosure may be applicable to any track-type mobile machine. However, the disclosed track pad may be particularly applicable to larger machines, in which a majority of track pad wear occurs at an inner link rail surface as opposed to an outer shoe surface. The disclosed track pad may include a wear indicator that allows for a replacement track pad to be ordered and service to be scheduled in advance of track pad failure. This may be particularly important for expensive machines that operate around the clock, where downtime of the machine is costly to the owner.

Existing machines may be retrofit to include track pad 20b. In particular, during a normal service event of machine 10, when machine 10 is already shut down for other maintenance activities to be performed, a service technician may be able to form wear indicators 46 into one or more existing track pads 20. To do so, the service technician may be required to disconnect or open the chain of track 16 and expose rail surfaces 36 of links 28. This may be accomplished via master link track pad 20a. Once rail surfaces 36 of the desired track pads 20 are exposed, the service technician may measure a height of links 28 to ascertain how much wear has already occurred within the particular track pads 20 (e.g., how much material has been removed), or how much wear can yet occur (e.g., how much material remains).

This may be done using conventional methods, such as ultrasonic testing. This measurement may then be compared to values corresponding with a new track pad 20 and/or values corresponding with a completely worn track pad 20 to determine a current condition of the existing track pad 20. The service technician may then form one or more recesses with rail surfaces 36 having depths corresponding to the amount of material remaining in the existing track pad.

The disclosed wear indicator 46 may be simple to use, and provides little opportunity for error. Specifically, the service technician or even an untrained operator of machine 10 may be able to glance at rail surfaces 36 of the indicating track pads 20b and, based on which or how many recesses are visible, quickly determine if servicing should be scheduled. For example, if only two recesses are visible, the operator may know that track pad 20b is 80% worn. If one recess is visible, the operator should initiate parts ordering and schedule servicing, as track pad 20b may be 100% worn. And if no recesses are visible, the track pad 20b may be 120% worn, and machine 10 should be pulled out of service. In addition, if the recesses of wear indicator 46 are unevenly worn, inspection, adjustment, and/or replacement of other undercarriage components may be necessary.

It will be apparent to those skilled in the art that various modifications and variations can be made to the disclosed track pad and associated wear indicator. Other embodiments will be apparent to those skilled in the art from consideration of the specification and practice of the disclosed track pad. It is intended that the specification and examples be considered as exemplary only, with a true scope being indicated by the following claims and their equivalents.

What is claimed is:

1. A track pad for a track type mobile machine having a sprocket and an idler wheel, the track pad comprising:
    a first link having a rail surface configured to engage the sprocket and the idler wheel;
    a second link oriented generally parallel with the first link and having a rail surface configured to engage the sprocket and the idler wheel;
    a ground engaging element connected to the first and second links at a side opposite the rail surfaces; and
    a wear indicator formed within the rail surface of at least one of the first and second links, wherein the wear indicator includes a plurality of recesses formed within the rail surface of at least one of the first and second links.

2. The track pad of claim 1, wherein each of the plurality of recesses has a different depth.

3. The track pad of claim 1, wherein the plurality of recesses are formed in a line along a length direction of the at least one of the first and second links.

4. The track pad of claim 1, wherein the plurality of recesses are formed in a grid pattern.

5. The track pad of claim 1, wherein the wear indicator includes at least one hole drilled into the rail surface of at least one of the first and second links.

6. The track pad of claim 1, wherein the wear indicator includes at least one chevron recessed within the rail surface of at least one of the first and second links.

7. The track pad of claim 1, wherein the wear indicator includes at least one alpha-numeric symbol recessed within the rail surface of at least one of the first and second links.

8. The track pad of claim 1, wherein the wear indicator is formed within the rail surfaces of both the first and second links.

9. The track pad of claim 1, wherein:
    the wear indicator is a first wear indicator; and
    the track pad further includes:
        a drive surface located between the first and second links and configured to engage lugs of the sprocket; and
        a second wear indicator formed within the drive surface.

10. The track pad of claim 1, wherein the first link, the second link, and the shoe are formed as a single integral component.

11. A method of retrofitting a track of an existing track type machine with a track pad wear indicator, the method comprising:
    measuring an amount of wear in links of a track pad forming a portion of the track; and
    fabricating at least one recess within a least one of the links of the track pad, the at least one recess corresponding with the amount of wear measured in the links.

12. The method of claim 11, wherein fabricating the at least one recess includes fabricating a plurality of recesses, each of the plurality of recesses corresponding with a different amount of material that can be worn away before the track pad should be replaced.

13. The method of claim 12, wherein fabricating the plurality of recesses includes fabricating the plurality of recesses to each have a different depth.

14. The method of claim 11, wherein fabricating the at least one recess includes drilling at least one hole.

15. The method of claim 11, further including disconnecting a master link of the track to expose a rail surface of the at least one of the links.

16. The method of claim 11, wherein fabricating at least one recess within a least one of the links includes fabricating at least one recess within each of the links of the track pad.

17. The method of claim 11, wherein:
    the track pad is a first track pad; and
    the method further includes:
        measuring an amount of wear in links of additional track pads forming a portion of the track, a number of the additional track pads being less than all of a remaining number of track pads; and
        fabricating at least one recess within a least one of the links of each of the additional track pads.

18. The method of claim 11, further including:
    measuring an amount of wear in a drive surface of the track pad; and
    fabricating at least one recess within the drive surface to have a depth corresponding to the amount of wear measured in the drive surface.

* * * * *